May 2, 1961 J. E. WHITFIELD 2,982,221
GEAR PUMP
Filed July 2, 1958 3 Sheets-Sheet 3
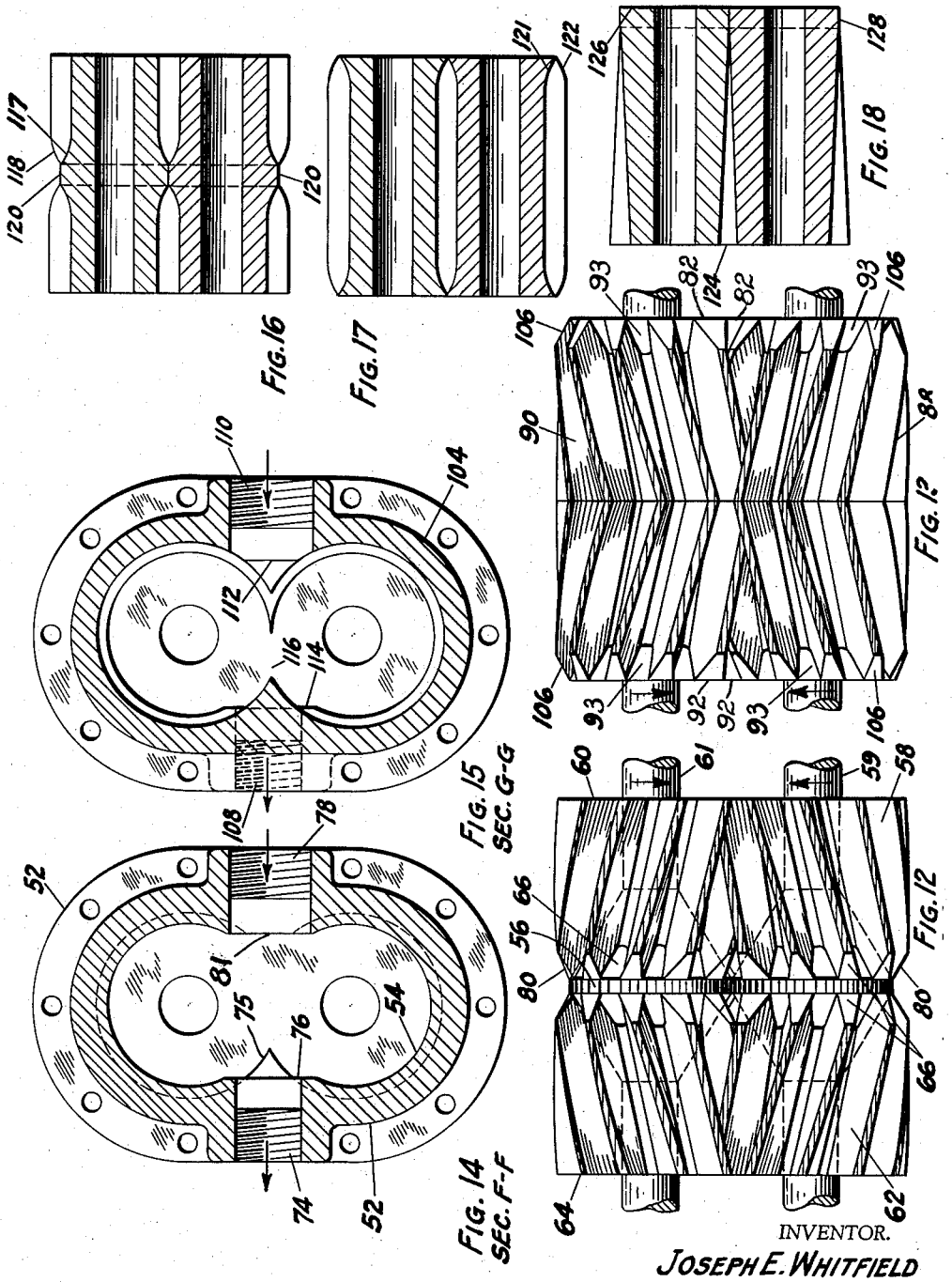
INVENTOR.
JOSEPH E. WHITFIELD
BY
ATTORNEY

United States Patent Office 2,982,221
Patented May 2, 1961

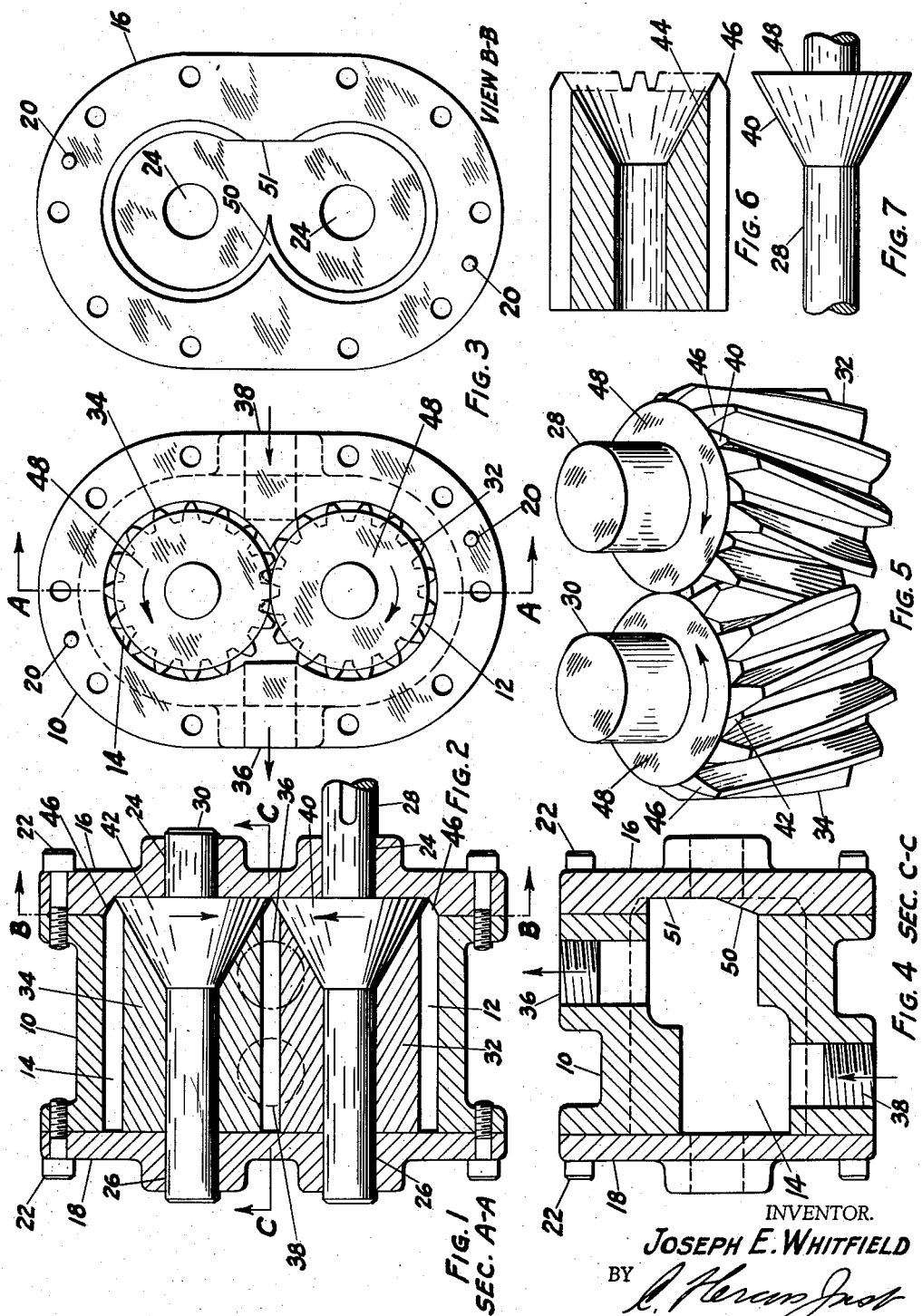

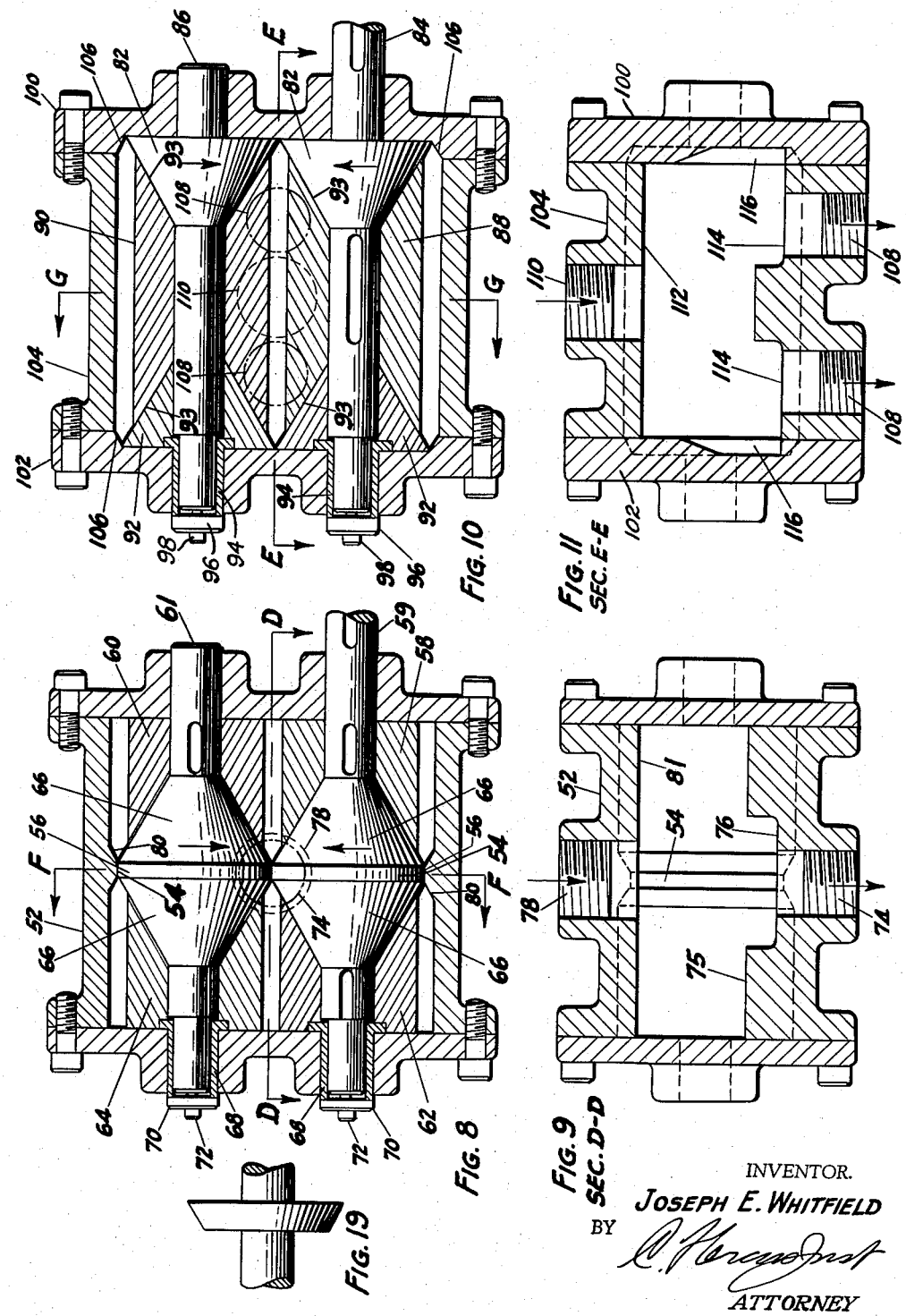

2,982,221
GEAR PUMP
Joseph E. Whitfield, Box 325, York, Pa.
Filed July 2, 1958, Ser. No. 746,145
14 Claims. (Cl. 103—128)

This invention relates generally to liquid pumps, liquid motors and similar devices in which intermeshing gears are provided with a suitable housing having suction and discharge openings or ports. More particularly, this invention relates to the specific form of the impeller gear members and the novel manner in which they operate with each other and with the housing to eliminate entrapment of the fluid being pumped and to provide leakproof sealing of the fluid.

Gear type devices of this general nature generally have two impeller gears which may have straight teeth and which are termed spur gears. Alternatively, they may have gears on which the teeth are slightly spiral and which are termed helical gears. The operating action of either spur or helical gears is practically the same in regard to this invention. The two gears are rotatably supported with their axes parallel, for example, and their complementary teeth intermeshing to form continuous seal lines the full length of the gears. The housing closely encloses both of the gear members and the perimetric tip of each gear tooth forms a seal therewith. Thus any flow of liquid from the suction side to the discharge side of the housing is conveyed around, by both of the gears, in the tooth spaces between the teeth and in conjunction with the bore of the housing.

The gear teeth must be complementary and if helical gears are used, then one must be right-hand and the mating gear left-hand. While more than two gears can be used, only two will be shown and described herein for purposes of simplicity. The gear on the power input shaft may be termed the driving gear and the mating gear may be termed the driven gear.

When rotated, the gears provide a continuous series of conveying tooth spaces, the tooth spaces forming just as the gear teeth roll out of mesh at the position of intersection at the suction side of the gears. This development of the tooth spaces creates a vacuum and the vacuum fills the spaces with the fluid being pumped. The fluid is carried around the gears to the point where the gears are meshing. Since the tooth profile is of such form that a seal is provided by the gears at their point of engagement, the fluid is restrained from passing through the period of engagement, or period of meshing, and is forced out the discharge port. In other words, the fluid can follow around the gears but not pass reversely between them, through the point of meshing.

Gear pumps of this general nature are usually reversible and reversing the rotation reverses the ports. This description, with one exception, discloses a device that is more efficient when operated in one certain direction and, in general, is not reversible.

This general type of device is old and well known in the art and they are used for various purposes. However, heretofore, all of these devices have had certain, very serious limitations. For example, at the point of engagement, as the teeth roll into mesh, the teeth on one gear must roll into and displace the fluid in the spaces of the mating gear. However, to prevent leakage, the teeth of one gear must fit precisely into the spaces of the mating gear and thus an entrapment of fluid occurs because of the minimum clearances which are provided, and are necessary, to prevent leakage. This entrapment condition limits the speed and efficiency of the pump unit. It also creates excess heat, noise and bearing loads in the pump, and pressures and speeds are soon reached beyond which the pump can not operate efficiently.

Many and varied attempts have been made to prevent entrapment of the liquid between the gear teeth. For example, tooth forms of various shapes have been proposed and tried, bleed passages have been cut from tooth to tooth or from the spaces to the shaft wherein the shaft may act as a valve to control the bleeding and leakage. Some of these features have been an improvement in a minor way but the problem of entrapment of liquid between the teeth of gear pumps has continued to remain fully unsolved until this present invention was conceived. In this disclosure, the design provided eliminates the entrapment condition entirely by not producing such a condition rather than producing entrapment and then attempting to vent and relieve the excess pressure.

Thus, the principal object of this invention is to eliminate the formation of entrapment pockets by the gear teeth.

A second important object is to produce a liquid pump suitable for high speed, high pressure and high efficiency by eliminating excess pressure periods.

A third object is to produce a pump that does not develop momentary pressures greater than the discharge pressure.

A fourth object is to produce a pump in which the tooth spaces and pockets are always open to the discharge port during the period of discharge.

A fifth object is to produce a pump whereby each and every pocket runs out to zero and exhausts completely, to the discharge, all the liquid within the said pockets as the gears revolve.

A sixth object is to produce a liquid pump where it is not necessary to cut vents or drill passages in the rotors or housing to prevent entrapment of the fluid being pumped.

A seventh object is to produce an entrapment free pump of such a design that is practical, easy to construct, simple in operation, free of complicated passages, and providing long service life.

Other objects and advantages will appear in the following specification, references being had to the several embodiments illustrated in the accompanying drawings comprising a part hereof and in which:

Fig. 1 is a longitudinal sectional view taken through the axes of the gear members of an exemplary pump as viewed on the line A—A of Fig. 2.

Fig. 2 is an end view of the housing and gear members with one end wall removed, showing the discharge end of the gear members.

Fig. 3 is a face view of the inner surface of the end wall removed from Fig. 2, as viewed on the line B—B of Fig. 1.

Fig. 4 is a longitudinal section through the housing and end walls only, the gears being removed, taken on the line C—C of Fig. 1.

Fig. 5 is a perspective view of a pair of exemplary pump gears in mesh, together with their shafts.

Fig. 6 is a longitudinal section through a typical pump gear of the type shown in Fig. 1.

Fig. 7 is a fragmentary side view of a typical gear shaft for use with the gear shown in Fig. 6.

Fig. 8 is a longitudinal section, taken through the axes of both shafts and showing another embodiment having a single discharge port in the center.

Fig. 9 is a section through the housing and end walls of Fig. 8 taken on the line D—D of Fig. 8, the gears being removed.

Fig. 10 is a longitudinal section of another embodiment taken through the axes of both shafts, the housing having a single suction port and two discharge ports.

Fig. 11 is a longitudinal section through the housing and end walls taken on the line E—E of Fig. 10, the gears being removed.

Fig. 12 is an outside view of the gears per se in mesh, of the type shown in section in the assembly, Fig. 8.

Fig. 13 is an outside view of the gears per se in mesh, of the type shown in section in the assembly, Fig. 10.

Fig. 14 is a transverse section through the housing shown in Fig. 8 taken on line F—F thereof and showing one end wall attached, the gears being removed.

Fig. 15 is a transverse section through the housing shown in Fig. 10, taken on line G—G thereof and showing one end wall attached, the gears being removed.

Fig. 16 is a longitudinal sectional view taken through the axes of a pair of pump gears somewhat similar to the gears shown in Figs. 8 and 12.

Fig. 17 is a longitudinal sectional view taken through the axes of a pair of pump gears somewhat similar to the gears shown in Figs. 10 and 13.

Fig. 18 is a sectional view taken through the axes of a pair of pump gears in which the outside diameter of both gears is tapered, the teeth running out to zero and forming short cylinders at one end.

Fig. 19 is a fragmentary side elevation showing the modification of a cone on a gear shaft.

In the specification and claims certain terms such as "tooth spaces," "addendum and dedendum," "pockets," "run out" and "entrapment" are used, and to render the meaning thereof clear, the following definitions are set forth:

*Tooth spaces.*—The grooves between gear teeth are normally called tooth spaces and it is these tooth spaces, or the volume thereof, that convey the fluid being pumped. Their size is fixed and constant.

Addendum is that part of the gear tooth outside the pitch circle, and dedendum is that part of the gear tooth within the pitch circle.

*Pockets.*—While the grooves between the teeth are called tooth spaces, when the gears are in mesh and the teeth on one gear are entering into the spaces on the mating gear a pocket is formed by the co-action of the two gears. The size of this pocket changes and diminishes almost to zero as the teeth roll through the mesh position.

*Run out.*—This term is generally applied in connection with the pockets. When a gear tooth is first entering a tooth space, the pocket is of maximum size and when the teeth are in full mesh the pocket is of minimum size or "run out." In spur gears the run out occurs throughout the length of the gear at the same time but in helical gears the final run out occurs at the discharge end of the gears.

*Entrapment.*—When a normal gear tooth pocket is being decreased in size by the rolling gear teeth action, entrapment of the liquid therein will occur unless some means is provided to allow the liquid to escape.

Referring to Figs. 1 and 2, the housing 10 of the pump contains two parallel cylindrical chambers 12 and 14 disposed side by side in parallelism and merging into one another, forming a common chamber, the cross-section of which is somewhat in the form of a figure 8. The ends of the housing are provided with end walls 16 and 18 and these end walls are located in their proper position by the dowells 20 and are held in place by the bolts 22. The end walls 16 is provided with cylindrical openings 24 and the end wall 18 is likewise provided with cylindrical openings 26 and these cylindrical openings 24 and 26 form the supporting bearings for the gear shafts 28 and 30. These gear shafts in turn carry the gears 32 and 34 which operate in the gear chambers 12 and 14 respectively. With the discharge port 36 in front as shown in phantom, Fig. 1, and the gears rotating in the direction shown, the lower gear 32 would be right hand and the upper gear 34 would be left hand as shown in Fig. 5. The suction port 38 is diagonally opposite the discharge port in the rear side of the housing.

The shafts 28 and 30 are provided with conically enlarged diameters 40 and 42 respectively, the large diameter of the cones being substantially equal to the pitch circle of the gears. One end of each gear is taper bored to provide a fit complementary to the conical portion of the shafts, the large diameter of the tapered bore being equal to the pitch circle. This tapered bore 44, Fig. 6, could have an angle of about 30° measured from the gear center but other angles also would operate. The ends of the gear teeth outside the pitch circle are tapered in the reverse direction 46, Fig. 6, and have the same angle of taper as the cones 40 and 42 on the shafts 28 and 30 respectively. Thus the gears have a relatively long uniform section in which the gear teeth may have any form common to this type of device and the gear teeth do not change in size or shape throughout the length of the uniform end section.

The gears also have the relatively short non-uniform end section, as described above, in which the gear teeth and tooth spaces change continuously throughout the length of the non-uniform end section. To provide the non-uniform end section, the relatively short tapered bore 44, Fig. 6, begins substantially at the gear pitch circle and runs out into the cylindrical bore of the gear. This tapered bore 44 fits precisely with the conical surface 40 and 42 of the gear shafts. The teeth of the gears are also tapered, as described above, from the pitch circle to the tips of the teeth at an angle complementary to the cone surfaces 40 and 42. Thus the ends of the teeth at the discharge end may form a sharp edge at the intersection of the tapered bore 44 and the tapered gear tooth portion 46. In operation, this tapered portion 46 rolls on the conical portions 40 and 42 of the shafts 28 and 30. The edges of the flat circular ends 48 of the conical portion of the shafts roll together and are tangent at the centerline between the shafts. The end wall 16 is countersunk to receive the tapered ends 46 of the gears 32 and 34. The point of intersection 50, Fig. 3, of the counterbores is cut away on the discharge side at 51, to allow free discharge of the fluid being pumped.

In the embodiment illustrated in Fig. 8, double gears or herringbone gears are used to convey the fluid. An outside view of these gears is shown in Fig. 12. The operation of this design is similar to Fig. 1 except that the pockets run out in the center because of the herringbone type gears.

The housing 52 of Fig. 8 has two cylindrical intersecting bores in which the gears operate. Midway in each of these bores is a sealing rib 54 which is beveled on its edges to seal with the tapered ends of the gear teeth. The inside diameter of the rib 54 seals with the large diameter cylindrical surface 56 of the gear shafts.

The gear 58 may be fixedly attached by keying to its shaft 59 and the gear 60 may be fixedly attached by keying to its shaft 61, before assembly. These assemblies are then assembled into the housing 52 from the right-hand end as shown. Gear 62 is next assembled and has a tight fit with and is keyed to its shaft 59. The gear 64 is last assembled and is not keyed to its shaft 61 so that it can properly locate itself in relation to the other gears. The gears 62 and 64 are located tightly against the conical surfaces 66 of the shafts by the bushings 68, the clamp plates 70 and the screws 72. The herringbone type gears, Fig. 12, used in this embodiment eliminate end thrust of the gears which is essential in large pumps developing high pressure. Gears cut with the helix angles as shown in Fig. 12 and operated as shown by the arrows would discharge on the forward side and the discharge port 74 would be located as shown in Figs. 8, 9, and 14, the port in Fig. 8 being shown in phantom. This is the point where the pockets completely run out and discharge all their fluid.

The intersection 75 of the gear bores may be partially cut away, as at 76, in Figs. 9 and 14 to allow easier flow to the outlet. The suction port 78, Figs. 8, 9 and 14, is directly opposite the discharge port and the entire intersection point of the gear bores may be cut away, as at 81 in Figs. 9 and 14, to allow better filling of the gear tooth spaces. The two cylindrical surfaces 56 of the shafts 59 and 61 roll together and are tangent midway between the shafts. The tapered bore portions of the gears within the pitch circles bear tightly against the conical surfaces 66 of the shafts and eliminate leakage at these points. The reverse tapered ends 80 of the gear teeth that lie outside the pitch circle operate with a close running clearance against the sealing rib 54 and also against the conical surfaces 66 of the shafts. Thus a device is provided that has no entrapment pockets, no leakage openings and no end thrust on the gears.

Fig. 10 shows another embodiment somewhat similar to Fig. 8 except that the pockets run out at the ends of the gears instead of at the center as in Fig. 8. There is a fixed cone 82 on each of the shafts 84 and 86 and the gears 88 and 90 are fixedly attached to the shafts and fit tightly against the cones. The separable cones 92 are assembled against the gears 88 and 90 and are held in place by the bushings 94, the clamp plates 96 and bolts 98. The cones 82 and 92 have a similar conical surface 93. The end walls 100 and 102 are counter-bored to receive the tapered ends of the gears, thus allowing the housing 104 to be made in one piece with straight through intersecting bores.

The gears 88 and 90 are taper bored in both ends to receive and fit with the cones 82 and 92 on shafts 84 and 86. The ends of the teeth on these gears are tapered in the reverse direction, 106, and these tapered teeth operate in close relation with the counter-bores in the end walls 100 and 102 and also roll on the cones 82 and 92 at the point of tangency. These gears 88 and 90 are also herringbone and the housing 104 for these gears must have two discharge outlets 108 as shown in Figs. 10, 11 and 15 and discharge at their extreme ends. The ports 108 in Fig. 10 are shown in phantom. A single suction port 110 is used. The intersection of the housing bores on the suction side is cut away throughout the length of the housing as at 112. The intersection on the discharge side of the housing is cut away only at the two discharge ports as at 114. The intersection of the counter-bores in the end walls 100 and 102 may be cut away on the discharge side as at 116. This cut away portion 116 is more clearly shown at 51 in Fig. 3. An outside view of the gears per se as used in Fig. 10 is shown in Fig. 13. Since the pocket run out of these gears occurs at the ends of the gears, two discharge ports are necessary. It should be clear that if two sets of the gears as in Fig. 5 are assembled with the non-uniform ends together, they will form gears as shown in Fig. 12, while if the same gears are assembled with the uniform ends together they will form gears as in Fig. 13.

The advantage of the design of Fig. 10 is that it has no entrapment pockets, no leakage openings, no end thrust on the gears and no rib in the center of the gear bores.

The gears shown in Fig. 16 are similar to those shown in Figs. 8 and 12 except the conical part is not made separately. The run out of the cutter or hob makes a radius 117 from the root of the teeth to the pitch circle and the teeth beyond the pitch circle are rounded off as at 118 to be complementary to 117 on the mating gear. The cylindrical surface 120 in each gear roll together and are tangent at the closest point between the shafts. The inlet and outlet ports would be the same as in Fig. 8. The rib 54 in Fig. 8 would be made complementary to the rounded ends 118 of the gear teeth when using these gears.

The gears in Fig. 17 are similar in action to those in Figs. 10 and 13 except where the teeth and tooth spaces in Fig. 13 are tapered in a conical manner from the root to the pitch circle and from the pitch circle to the tip of the teeth, the teeth in Fig. 17 have rounded surfaces. The surface 121 is concave and the surface 122 is convex and these surfaces are complementary on the mating gears when the pump is in operation.

These gears shown in Fig. 17 would operate in a housing similar to that shown in Figs. 10, 11 and 15 except that the conical shaped counterbore in the ends walls which matches the gear teeth ends 106 would be curved to match the rounded teeth ends 122.

Fig. 18 shows a pair of gears for a pump having the teeth tapered from full depth at the suction end 124 to zero depth at the discharge end 126. The cylindrical surfaces 128 roll together and form a seal at the point of tangency. These gears would operate in a housing similar to Fig. 1 except that both bores would be tapered and both end walls would be flat as, for example, on end wall 18 shown in Fig. 1.

Fig. 19 shows a modified shaft wherein the tapered surface is made shorter than is shown in Fig. 7. This would permit a longer cylindrical bore in the gear and may be more practical where the gears are short and relatively large in diameter.

The preferred form of the pump is shown in Figs. 1 and 5 and in Figs. 10 and 13, but the other embodiments may be more suitable under certain conditions of use requirements, whereby the various embodiments included herein are not to be regarded as full equivalents of each other.

Entrapment is not possible in a pump of this nature as the gears at the discharge end can be compared to two smooth rollers because, actually, where the pockets finally run out and discharge occurs, the ends of the gears are truly circular and are uninterrupted by gear teeth.

Referring to Figs. 1, 8 and 10 the cones on the two shafts need not be exactly the same size. For example, one could be slightly larger than the pitch circle and the other could be slightly smaller than the pitch circle. Alternatively, both could be slightly smaller than the pitch circle in which event the teeth would not come to a sharp point and the two cones would not be tangent but would be spaced apart somewhat.

Referring again to Fig. 10, the gears 88 and 90 could be spur gears instead of herringbone gears in which event the device would operate equally well in either direction by simply arranging proper ports. With herringbone gears it should operate in one direction only as entrapment would occur with center discharge if operated in reverse direction.

While the invention has been described and illustrated in several preferred embodiments, and has included certain details, it should be understood that the invention is not to be limited to the precise details herein illustrated and described since the same may be carried out in other ways falling within the scope of the invention as claimed.

In the specification and claims the words "inlet port," "suction port," "inlet connection" and "suction connection" have the same meaning. Likewise, the words "outlet port," "discharge port," "outlet connection" and "discharge connection" have the same meaning.

I claim:

1. A fluid gear pump having a housing provided with inlet and outlet ports, a pair of impeller gears having helical teeth thereon and spaces between said teeth and supported in meshing engagement within said housing, that portion of each tooth lying outside the pitch circle being the addendum and that portion of each tooth lying within the pitch circle being the dedendum and the dedendum extending from the pitch circle to the root of the teeth; in combination with means positioned within the spaces between the teeth on both gears to form generally conical surfaces, the conical surfaces beginning at the root of the teeth intermediately of the ends of the gears and terminating at the pitch circle of each gear near the discharge port and the addendum of the gear teeth on both gears being cut away in a generally conical manner from the tip of each tooth intermediately of the ends thereof to the pitch circle and shaped complementarily to the portions of the conical surfaces in the spaces between the gear teeth on the mating gear, the portions of the conical surfaces in the spaces between the gear teeth lying inside the pitch circle of one gear and operating with a generally rolling action upon the conical surfaces of the teeth of the other gear which lie outside the pitch circle when the gears are rotated and said tooth action being operable to force the fluid from the tooth spaces and discharge it at the pitch circle of the gears and through the outlet port of the housing.

2. The fluid gear pump set forth in claim 1 further characterized by the general conical surface on the gears terminating substantially at the pitch circle of the teeth on said gears and at one end of each gear, the terminal ends of said conical surfaces substantially rolling upon each other during the rotation of the gears.

3. The fluid gear pump set forth in claim 1 further characterized by one end of the housing being counterbored complementarily to the addendum conical surfaces of the gears and the counterbores receiving said addendum conical surfaces.

4. A fluid pump comprising a housing provided with a pair of coextensive intersecting bores and also having suction and discharge ports, an end wall on each end of the housing, each end wall having a pair of cylindrical bearing openings coaxial with the housing bores, and a pair of impeller gears having shafts fixed thereto and rotatably supported by said bearing openings; said impeller gears having intermeshing helical teeth and corresponding helical spaces therebetween and the coaction of the gear teeth and tooth spaces of the gears successively forming pockets as the gears revolve and each of said gears being provided with a bore fixedly receiving one of said shafts, one portion of the bore of each gear being cylindrical and another portion being tapered generally conically and arranged with the large end of the tapered bore beginning substantially at the pitch circle at one end of the gear and tapering inwardly to said cylindrical portion of the bore intermediately of the ends of the gear and said shafts each having an enlarged section intermediately of the ends thereof, one side of said enlarged section being conical and complementary to the conically tapered portion of the bore of each gear and the other side of said enlarged section being substantially at a right angle to the axis of the shaft and substantially flush with and forming one end of the gear, said shafts being fixed within the bores of said gears to provide conical surfaces at one end of the spaces between the gear teeth adjacent one end of the gears and the addendum of the gear teeth on the same end of the gears being provided with a generally conical surface complementary to and cooperating with the conical surfaces on the enlarged section of the shaft at the ends of the spaces between the gear teeth of the mating gear.

5. A fluid pump comprising a housing provided with substantially parallel intersecting bores and also having suction and discharge ports, an end wall on each end of the housing, each end wall having a pair of cylindrical bearing openings coaxial with the bores in the housing and impeller gears having shafts rotatably supported by said bearing openings, said impeller gears having teeth and spaces therebetween and the coaction of the gear teeth and spaces of the gears successively forming pockets as the gears revolve and each of said gears being provided with a bore fixedly receiving one of said shafts, one portion of the bore of each gear being cylindrical and another portion being tapered generally conically and arranged with the large end of the tapered bore beginning substantially at the pitch circle at one end of the gear and tapering inwardly to said cylindrical portion of the bore intermediately of the ends of the gear and said shafts each having an enlarged section intermediately of the ends thereof, one side of said enlarged section being conical and complementary to the conically tapered portion of the bore of each gear and the periphery of the largest diameter of said tapered portions of each shaft being circular and positioned within the housing substantially to roll upon the periphery of the largest diameter of the tapered portion of the other shaft, the other side of said enlarged section of each shaft being substantially at a right angle to the axis of the shaft and substantially flush with and forming one end of the gear, said shafts being fixed within the bores of said gears to provide conical surfaces at one end of the spaces between the gear teeth adjacent one end of the gears and the addendum of the gear teeth on the same end of the gears being provided with a generally conical surface complementary to and cooperating with the conical surfaces on the enlarged section of the shaft at the ends of the spaces between the gear teeth of the mating gear.

6. A fluid pump comprising a housing provided with a pair of substantially coextensive intersecting bores and also having suction and discharge ports, an end wall on each end of the housing, each end wall having a pair of cylindrical bearing openings coaxial with the bores in the housing and impeller gears having shafts fixed therein and rotatably supported by said bearing openings, said impeller gears having helical teeth and helical spaces therebetween and the coaction of the gear teeth and tooth spaces of the gears successively forming pockets as the gears revolve and each of said gears being provided with a bore to receive the shafts, one portion of the bore being cylindrical and another portion being tapered in a generally conical manner and arranged with the large end of the tapered bore beginning substantially at the pitch circle of the gear and tapering inwardly to said cylindrical portion of the bore intermediately of the ends of the gear and said shafts each having an enlarged section intermediately of the ends thereof, one side of said enlarged section of each shaft being conical and complementary to the conically tapered portion of the bore of each of the gears and the other side of said enlarged sections being substantially at a right angle to the axis of the shafts and substantially flush with and forming one end of the gears, said shafts being fixed within the bores of said gears to provide conical surfaces at one end of the spaces between the gear teeth adjacent one end of the gears and the addendum of the gear teeth on the same end of the gear being cut away in a generally conical manner to cooperate with the conical surfaces on the shaft at the ends of the spaces between the gear teeth of the mating gear, one end wall of the housing being provided with counterbores having flat bottoms and side walls tapered complementarily to the cutaway addendum portion of the gear teeth of said gears and receiving said end portions of the gears, whereby said cutaway addendum portions of the teeth have an operating sealing fit with the counterbored surfaces of said end wall.

7. The fluid pump set forth in claim 6 further characterized by the helical gear teeth and helical spaces therebetween forming pockets at one end of the gears and said pockets running out to zero when said gears are rotated in one direction, and means on one end of one of said gears connectable to a source of power to drive said gears in one rotary direction.

8. A fluid pump comprising a housing provided with parallel intersecting bores and suction and discharge ports, an end wall on each end of the housing, each end wall having a pair of cylindrical bearing openings coaxial with the bores in said housing, and a pair of mating gear impellers, each impeller comprising a right-hand and left-hand helical gear in axial alignment upon and fixed to a shaft rotatably supported by said bearing openings, said right and left-hand gears of each impeller forming herringbone teeth and complementary spaces therebetween extending inward axially from opposite ends thereof and complementary to the teeth and spaces of the mating impeller, the coaction of the herringbone gear teeth and tooth spaces of the mating impellers successively forming pockets at opposite ends of the impellers as the impellers revolve and said pockets advancing respectively toward the middle of said impellers, each of said gears of said impellers also being provided with a bore to receive the shafts of said impellers, the outer end portion of the bore of each gear of each impeller being cylindrical and the inner end portions thereof being tapered generally conically from the pitch circle of the gear teeth to the cylindrical portion of the bore and the large ends of the tapered bore of said gears facing each other when assembled on the shaft of each pair of gears, and said shafts each having an enlarged section intermediately of the ends thereof, the opposite sides of said enlarged section being similarly conical and respectively complementary to the conically tapered portions of the bores of said gears, said shafts being fixed to said gears thereof and providing conical surfaces within the spaces between the gear teeth thereof intermediately of the ends thereof and the addendum of the gear teeth being formed with a generally conical surface complementary to and cooperating with the conical surfaces on the shafts of the mating impeller.

9. The fluid pump set forth in claim 8 further characterized by the bores of said housing having an annular rib intermediately of the ends thereof complementary to and received between the cutaway addendum portions of the teeth of the gears of said impellers.

10. A fluid pump comprising a housing provided with parallel intersecting bores and suction and discharge ports, an end wall on each end of the housing, each end wall having a pair of axially aligned cylindrical bearing openings, and impeller gears fixed to shafts rotatably supported by said bearing openings, said impeller gears having complementary herringbone gear teeth and spaces therebetween and the coaction of the gear teeth and tooth spaces of the gears successively forming pockets intermediately of the ends of said gears and said pockets advancing in opposite directions toward the ends of said gears, each of said gears being provided with a bore to receive the shafts, the intermediate portion of the bore being cylindrical and the end portions of each bore being tapered similarly and generally conically, the large end of the tapered bores beginning at the pitch circle of the gear and respectively sloping inwardly from the ends to the cylindrical portion of the bore intermediate of the ends of the gear, and said shafts each having an enlarged section thereon at the ends thereof arranged with the sides of the enlarged sections nearest each other being conical and complementary to the conically tapered portions of the bores within which they are received and the other side of said enlarged sections being substantially at a right angle to the axis of the shaft and comprising the end surfaces of said gears, said shafts being fitted closely into the bores of said gears to provide conical surfaces within the spaces between the gear teeth at the ends thereof and the addendum of the gear teeth being formed with a generally conical surface complementary to and cooperating with the generally conical surface on the shaft between the teeth of the mating gear.

11. The fluid pump set forth in claim 10 further characterized by said housing being provided with a pair of outlet ports respectively adjacent the opposite ends of said gears and an inlet port intermediately of the ends thereof and the side of the housing opposite to that having the outlet ports therein.

12. A fluid pump comprising a housing provided with substantially parallel intersecting bores and also having suction port means on one side of said housing and discharge port means on the opposite side of said housing, an end wall on each end of the housing, each end wall having a pair of cylindrical bearing openings coaxial with the housing bores, and impeller gears having substantially parallel shafts rotatably supported in said bearing openings, said impeller gears being similar but having complemenrtay helical teeth and spaces therebetween and said teeth decreasing in height at the discharge end, the form of said teeth at the suction end being similar to gear teeth in conventional gear pumps and the thickness of said teeth on the pitch circle being substantially the same throughout their length, that part of each tooth within the pitch circle of each gear decreasing in height toward the discharge end of each gear to produce between said teeth a conical surface which diverges outwardly to and terminates at the pitch circle, and that portion of the teeth outside the pitch circle tapering inwardly toward the discharge end of each gear, said decrease in height and said taper beginning intermediately the ends of the teeth and terminating at the pitch circle, the teeth and spaces of the gears forming pockets as the gears revolve together, the pockets decreasing in volume to zero and running out in a true rolling motion on the pitch circle at the discharge end of the gears and the bores of the housing being complementary to the outside diameter of the gears.

13. The fluid pump set forth in claim 12 further characterized by said conical surface portions of said gears being positioned adjacent the discharge port means of said housing.

14. The fluid pump set forth in claim 12 further characterized by the impeller gears having complementary herringbone teeth thereon.

References Cited in the file of this patent

UNITED STATES PATENTS

| | | |
|---|---|---|
| 514,659 | Morgan | Feb. 13, 1894 |
| 678,570 | Jones | July 16, 1901 |
| 1,698,802 | Montelius | Jan. 15, 1929 |
| 1,991,541 | Cannizzaro | Feb. 19, 1935 |
| 2,079,083 | Montelius | May 4, 1937 |
| 2,294,805 | Robinson | Sept. 1, 1942 |
| 2,319,374 | Ungar | May 18, 1943 |
| 2,381,695 | Sennet | Aug. 7, 1945 |
| 2,460,278 | Cook | Feb. 1, 1949 |
| 2,622,787 | Nilsson | Dec. 23, 1952 |
| 2,922,377 | Whitfield | Jan. 26, 1960 |

FOREIGN PATENTS

| | | |
|---|---|---|
| 62,290 | Denmark | May 30, 1944 |
| 63,424 | Denmark | Apr. 23, 1945 |
| 93,979 | Sweden | Dec. 28, 1938 |
| 384,355 | Great Britain | Dec. 8, 1932 |
| 464,475 | Great Britain | Apr. 16, 1937 |
| 672,700 | Germany | Mar. 8, 1939 |
| 789,211 | France | Aug. 12, 1935 |